United States Patent
Yamada

(10) Patent No.: US 12,475,751 B2
(45) Date of Patent: Nov. 18, 2025

(54) INFORMATION PROCESSING DEVICE, VEHICLE, AND INFORMATION PROCESSING SYSTEM

(71) Applicant: TOYOTA JIDOSHA KABUSHIKI KAISHA, Toyota (JP)

(72) Inventor: Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 18/483,991

(22) Filed: Oct. 10, 2023

(65) Prior Publication Data

US 2024/0185652 A1 Jun. 6, 2024

(30) Foreign Application Priority Data

Dec. 5, 2022 (JP) ................................. 2022-193915

(51) Int. Cl.
G07C 5/08 (2006.01)
G07C 5/00 (2006.01)

(52) U.S. Cl.
CPC ............. G07C 5/085 (2013.01); G07C 5/008 (2013.01)

(58) Field of Classification Search
CPC ....... B60W 2540/10; B60W 2710/182; B60W 2510/182; F02D 2200/602
See application file for complete search history.

(56) References Cited

U.S. PATENT DOCUMENTS

| 5,566,072 A * | 10/1996 | Momose ................. B60T 8/174 706/900 |
| 10,060,366 B1 * | 8/2018 | Rollinger ............ F02D 41/0007 |
| 2006/0070794 A1 * | 4/2006 | Fujita ................. B62D 15/0245 180/446 |
| 2008/0223634 A1 * | 9/2008 | Yamamoto .............. B60L 50/16 180/65.285 |
| 2012/0089294 A1 * | 4/2012 | Fehse ..................... G08G 1/168 701/25 |
| 2013/0211686 A1 | 8/2013 | Shono et al. |
| 2014/0350777 A1 | 11/2014 | Kawai et al. |
| 2015/0336587 A1 | 11/2015 | Inoue et al. |

(Continued)

FOREIGN PATENT DOCUMENTS

| JP | 2007-133486 A | 5/2007 |
| JP | 2014-229228 A | 12/2014 |

(Continued)

OTHER PUBLICATIONS

Bigelow, Stephen J. Multicore Processor. Mar. 3, 2022. TechTarget. Date accessed: Feb. 24, 2025. <https://web.archive.org/web/20220312013152/https://www.techtarget.com/searchdatacenter/definition/multi-core-processor> (Year: 2022).*

(Continued)

*Primary Examiner* — Logan M Kraft
*Assistant Examiner* — Joshua Campbell
(74) *Attorney, Agent, or Firm* — Oliff PLC

(57) ABSTRACT

A brake ECU executes a process including the steps of: acquiring input information; determining whether predetermined conditions are met; when the predetermined conditions are met, acquiring vehicle speed data; updating a vehicle speed frequency distribution using the acquired vehicle speed data; and sending the updated vehicle speed frequency distribution to a data center.

12 Claims, 8 Drawing Sheets

(56) References Cited

U.S. PATENT DOCUMENTS

| | | | |
|---|---|---|---|
| 2017/0356350 A1* | 12/2017 | Li | ................ F02D 41/1406 |
| 2023/0162541 A1 | 5/2023 | Yamada et al. | |
| 2023/0177950 A1 | 6/2023 | Ueno et al. | |

FOREIGN PATENT DOCUMENTS

| | | |
|---|---|---|
| JP | 2015-170249 A | 9/2015 |
| JP | 2015-219830 A | 12/2015 |
| JP | 2017-215654 A | 12/2017 |
| JP | 2018-190297 A | 11/2018 |
| JP | 2023-075502 A | 5/2023 |
| JP | 2023-082863 A | 6/2023 |
| WO | 2012/029178 A1 | 3/2012 |

OTHER PUBLICATIONS

U.S. Appl. No. 18/215,932, filed Jun. 29, 2023 in the name of Yoshihisa Yamada et al.

U.S. Appl. No. 18/214,872, filed Jun. 27, 2023 in the name of Yoshihisa Yamada et al.

\* cited by examiner

INFORMATION PROCESSING DEVICE, VEHICLE, AND INFORMATION PROCESSING SYSTEM

CROSS-REFERENCE TO RELATED APPLICATION

This application claims priority to Japanese Patent Application No. 2022-193915 filed on Dec. 5, 2022, incorporated herein by reference in its entirety.

BACKGROUND

1. Technical Field

This disclosure relates to an information processing device, a vehicle, and an information processing system.

2. Description of Related Art

A technology of determining whether a driver of a vehicle is in a state of taking his or her eyes off the road by using data relating to a driving state of the driver is publicly known. For example, Japanese Unexamined Patent Application Publication No. 2017-215654 (JP 2017-215654 A) discloses a technology of, using data such as a state of the driver's line of sight and a vehicle speed, determining whether a time for which the direction of the driver's line of sight remains outside a criterial range has reached a criterial time, and thereby determining whether a driver is in a state of taking his or her eyes off the road.

SUMMARY

JP 2017-215654 A described above discloses the technology of determining the driver's driving trait based on whether the direction of the driver's line of sight is within a criterial range according to which one of travel scenes, moving straight ahead, moving around a curve, and turning right or left, applies. However, efficiently evaluating the driver's driving trait requires further improvement.

This disclosure has been contrived to solve the aforementioned challenge, and an object thereof is to provide an information processing device, a vehicle, an information processing system, an information processing method, and a program that efficiently evaluate a driver's driving trait.

An information processing device according to one aspect of this disclosure is an information processing device that calculates an amount of characteristic relating to a driving characteristic of a driver of a vehicle. This information processing device includes: an acquisition unit that acquires an amount of operation of the vehicle; a first processing unit that identifies a predetermined driving state during travel of the vehicle using the acquired amount of operation; and a second processing unit that calculates the amount of characteristic in the predetermined driving state.

Thus, by calculating the amount of characteristic in the predetermined driving state that has been identified, the driver's driving trait can be efficiently evaluated.

In one embodiment, the predetermined driving state includes a steady travel state.

Thus, by identifying the steady travel state and calculating the amount of characteristic in the identified driving state, the driver's driving trait in that driving state can be efficiently evaluated.

In another embodiment, the acquisition unit acquires an accelerator operation amount of the vehicle. The first processing unit identifies, as the predetermined driving state, a driving state in which an amount of change in the accelerator operation amount becomes equal to or smaller than a threshold value during travel of the vehicle.

Thus, the predetermined driving state can be identified without using a complicated device.

In yet another embodiment, the amount of characteristic includes a history of a speed of the vehicle.

Thus, from the history of the speed of the vehicle in a driving state in which the vehicle travels at a constant speed, a driving trait such as whether the driver is driving in harmony with the surroundings in a cluster of vehicles or whether the driver tends to observe the speed limit can be efficiently evaluated.

In yet another embodiment, the information processing device further includes a third processing unit that calculates a frequency distribution of the speed of the vehicle.

Thus, from the frequency distribution of the speed of the vehicle, a driving trait such as whether the driver is driving in harmony with the surroundings in a cluster of vehicles or whether the driver tends to observe the speed limit can be efficiently evaluated.

In yet another embodiment, the predetermined driving state includes a driving state in which the vehicle is steered while moving straight ahead.

Thus, by identifying a driving state in which the vehicle is steered while moving straight ahead and calculating an amount of characteristic in the identified driving state, the driver's driving trait in that driving state can be efficiently evaluated.

In yet another embodiment, the amount of characteristic includes a time-integrated value of a difference between a first steering amount that is estimated from a behavior of the vehicle and a second steering amount that is an actual amount steered.

Thus, from the time-integrated value of the difference between the first steering amount and the second steering amount in a driving state in which the vehicle is maneuvered while moving straight ahead, a driving trait such as whether the driver is operating the steering wheel wastefully or whether the driver is skilled in operating the steering wheel can be efficiently evaluated.

In yet another embodiment, the information processing device further includes a third processing unit that calculates a frequency distribution of the time-integrated value.

Thus, from the frequency distribution of the time-integrated value, a driving trait such as whether the driver is operating the steering wheel wastefully or whether the driver is skilled in operating the steering wheel can be efficiently evaluated.

In yet another embodiment, the predetermined driving state includes a driving state until the vehicle that is traveling is stopped.

Thus, by identifying a driving state until the vehicle that is traveling is stopped and calculating an amount of characteristic in the identified driving state, the driver's driving trait in that driving state can be efficiently evaluated.

In yet another embodiment, the amount of characteristic includes a difference between a peak value of a brake oil pressure and a mean value of the brake oil pressure after a peak.

Thus, from the difference between the peak value and the mean value of the brake oil pressure, a driving trait such as whether the driver is used to brake operation can be efficiently evaluated.

In yet another embodiment, the information processing device further includes a third processing unit that identifies to which class the difference corresponds among a plurality of classes that is divided in order of a magnitude of the difference.

Thus, by identifying to which class the difference corresponds among the plurality of classes, a driving trait such as whether the driver is used to brake operation can be efficiently evaluated.

A vehicle according to another aspect of this disclosure is a vehicle including an information processing device that calculates an amount of characteristic relating to a driving characteristic of a driver. The information processing device includes: an acquisition unit that acquires an amount of operation of the vehicle; a first processing unit that identifies a predetermined driving state during travel of the vehicle using the acquired amount of operation; and a second processing unit that calculates the amount of characteristic in the predetermined driving state.

An information processing system according to yet another aspect of this disclosure includes an information processing device that calculates an amount of characteristic relating to a driving characteristic of a driver of a vehicle, and a server that manages information sent from the information processing device. The information processing device includes: an acquisition unit that acquires an amount of operation of the vehicle; a first processing unit that identifies a predetermined driving state during travel of the vehicle using the acquired amount of operation; and a second processing unit that calculates the amount of characteristic in the predetermined driving state.

A vehicle information processing method according to yet another aspect of this disclosure is an information processing method that calculates an amount of characteristic relating to a driving characteristic of a driver of a vehicle. This information processing method includes the steps of: acquiring an amount of operation of the vehicle; identifying a predetermined driving state during travel of the vehicle using the acquired amount of operation; and calculating the amount of characteristic in the predetermined driving state.

A program according to yet another aspect of this disclosure makes a computer execute the steps of: acquiring an amount of operation of a vehicle; identifying a predetermined driving state during travel of the vehicle using the acquired amount of operation; and calculating an amount of characteristic relating to a driving characteristic of a driver of the vehicle in the predetermined driving state.

According to this disclosure, the information processing device, the vehicle, the information processing system, the information processing method, and the program that efficiently evaluate a driver's driving trait can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
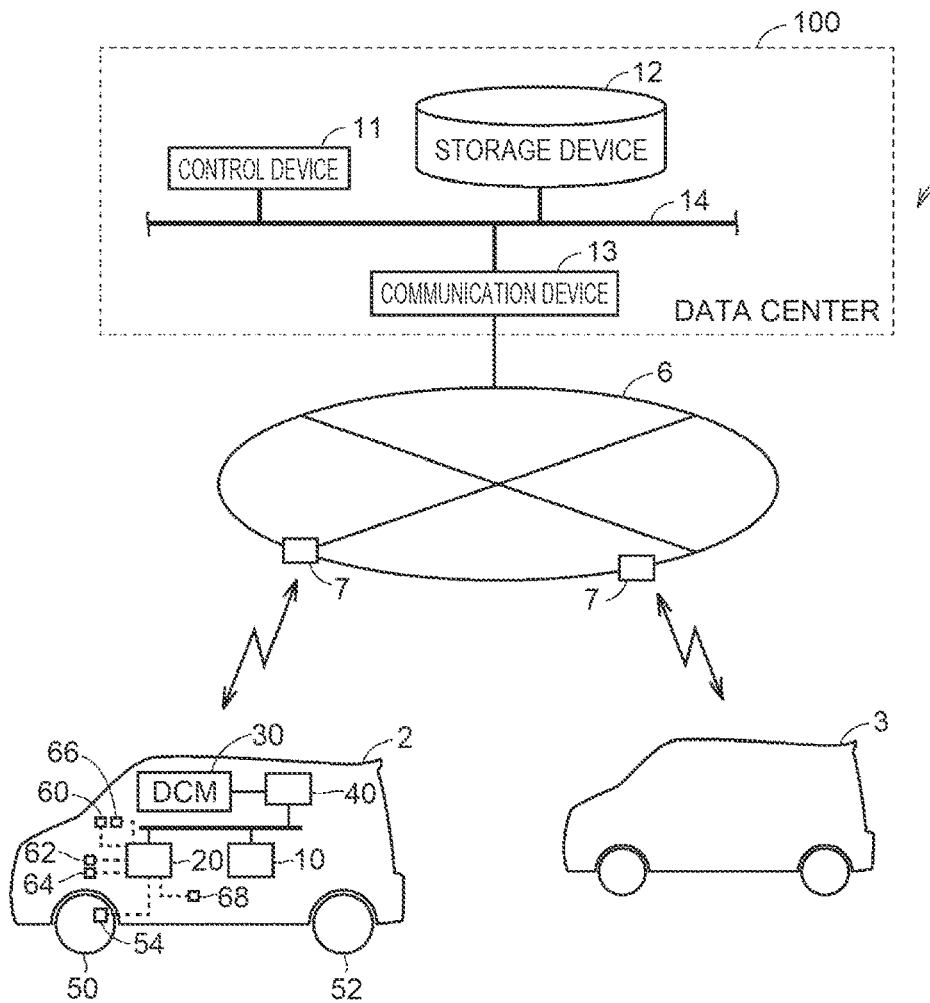
FIG. 1 is a diagram for describing one example of the configuration of an information processing system.

An embodiment of this disclosure will be described in detail below with reference to the drawings. The same or corresponding parts in the drawings will be denoted by the same reference signs and description thereof will not be repeated.

FIG. 1 is a diagram for describing one example of the configuration of an information processing system 1. As shown in FIG. 1, in this embodiment, the information processing system 1 includes a plurality of vehicles 2, 3, a communication network 6, base stations 7, and a data center 100.

The vehicles 2, 3 may be any vehicles that can communicate with the data center 100, and may be, for example, vehicles having an engine as a driving source, or battery electric vehicles having an electric motor as a driving source, or hybrid electric vehicles equipped with an engine and an electric motor and using at least one of them as a driving source. While only two vehicles 2, 3 are shown in FIG. 1 for the convenience of description, the number of vehicles is not particularly limited to two and may instead be three or more.

The information processing system 1 is configured to acquire predetermined information from the vehicles 2, 3 that are configured to be able to communicate with the data center 100, and manage the acquired information.

The data center 100 includes a control device 11, a storage device 12, and a communication device 13. The control device 11, the storage device 12, and the communication device 13 are communicably connected to one another through a communication bus 14.

The control device 11 includes, in its configuration, a central processing unit (CPU), a memory (a read-only memory (ROM), a random-access memory (RAM), etc.), an input-output port for inputting and outputting various signals (none of which is shown), etc. Various types of control executed by the control device 11 are executed by software processing, i.e., as the CPU retrieves programs stored in the memory. The various types of control by the control device 11 can also be realized as a general-purpose server (not shown) executes programs stored in a storage medium. However, the various types of control by the control device 11 is not limited to being processed by software and may instead be processed by dedicated hardware (an electronic circuit).

The storage device 12 stores predetermined information relating to the vehicles 2, 3 that are configured to be able to communicate with the data center 100. The predetermined information includes, for example, information relating to an amount of characteristic, to be described later, that is calculated in each of the vehicles 2, 3, information for identifying the vehicles 2, 3 (hereinafter referred to as a "vehicle ID"), and information for locating the positions of the vehicles 2, 3. The vehicle ID is unique information set for each vehicle. The vehicle ID allows the data center 100 to identify a vehicle that is a sending origin.

The communication device 13 realizes bidirectional communication between the control device 11 and the communication network 6. Using the communication device 13, the data center 100 can communicate with a plurality of vehicles including the vehicles 2, 3 through the base stations 7 provided in the communication network 6.

Next, the specific configuration of the vehicles 2, 3 will be described. As the vehicles 2, 3 basically share the same configuration, the configuration of the vehicle 2 will be described below as a representative.

The vehicle 2 includes front wheels 50 that are driving wheels and rear wheels 52 that are driven wheels. As the front wheels 50 are rotated by operation of the driving source, a driving force is exerted on the vehicle 2, causing the vehicle 2 to travel.

The vehicle 2 further includes an advanced driver assist system electronic control unit (ADAS-ECU) 10, a brake ECU 20, a data communication module (DCM) 30, and a central ECU 40.

Each of the ADAS-ECU 10, the brake ECU 20, and the central ECU 40 is a computer having a processor, such as a CPU, that executes programs, a memory, and an input-output interface.

The ADAS-ECU 10 includes a driving assistance system having functions relating to driving assistance of the vehicle 2. The driving assistance system is configured to execute applications installed therein and thereby realize various functions for assisting driving of the vehicle 2, including at least one of steering control, driving control, and braking control of the vehicle 2. Examples of applications installed in the driving assistance system include an application that realizes a function of an autonomous driving (AD) system, an application that realizes a function of autonomous parking system, and an application that realizes a function of an advanced driver assist system (ADAS).

Based on information on conditions around the vehicle acquired (input) from a plurality of sensors (not shown), the driver's assistance request, etc., each application of the driving assistance system outputs, to the brake ECU 20, a request for an action plan that secures the merchantability (functions) of the application by itself. The plurality of sensors includes, for example, a vision sensor, such as a forward camera, a radar, a light detection and ranging (LiDAR), and a position detection device.

Each application acquires information on the conditions around the vehicle that integrates detection results of one or more sensors as recognition sensor information, and acquires the driver's assistance request via a user interface (not shown), such as a switch. Each application can recognize other vehicles, obstacles, and persons present around the vehicle by, for example, performing image processing using artificial intelligence (AI) or an image processing processor on an image or a video of the surroundings of the vehicle acquired by a plurality of sensors.

Using detection results from sensors, the brake ECU 20 controls a brake actuator that generates a braking force in the vehicle 2. Further, the brake ECU 20 sets a motion request for the vehicle 2 for realizing the action plan request from the ADAS-ECU 10. The motion request for the vehicle 2 set in the brake ECU 20 is realized by actuator systems (not shown) provided in the vehicle 2. The actuator systems include multiple types of actuator systems, such as a power train system, a brake system, and a steering system.

For example, a wheel speed sensor 54, a steering angle sensor 60 that detects a steering angle (an operation angle of a steering wheel), a brake oil pressure sensor 62 that detects a master cylinder oil pressure (brake oil pressure), an accelerator operation amount sensor 64 that detects a pressing amount of an accelerator pedal (accelerator operation amount), a yaw rate sensor 66, and a G sensor 68 are connected to the brake ECU 20.

The wheel speed sensor 54 detects a rotation speed (the number of rotations) of the front wheels 50 as a wheel speed. The wheel speed sensor 54 sends a signal indicating the detected rotation speed of the front wheels 50 to the brake ECU 20.

The steering angle sensor 60 detects an angle to which the steering wheel has been operated as a steering angle (steering amount). The steering angle sensor 60 sends a signal indicating the detected steering angle to the brake ECU 20.

The brake oil pressure sensor 62 is connected to a brake oil pressure circuit that supplies an oil pressure to a braking device provided in each wheel, and detects, as a brake oil pressure, an oil pressure inside an oil pressure chamber of a master cylinder that is configured to increase the oil pressure inside the brake oil pressure circuit according to a pressing amount of a brake pedal. The brake oil pressure sensor 62 sends a signal indicating the detected brake oil pressure to the brake ECU 20.

The accelerator operation amount sensor 64 detects the pressing amount of the accelerator pedal as an accelerator operation amount. The accelerator operation amount sensor 64 sends a signal indicating the detected accelerator operation amount to the brake ECU 20.

The yaw rate sensor 66 detects a rotational angular speed (yaw rate) of the vehicle 2 in a turning direction (hereinafter also referred to as a "yaw direction"). The yaw rate sensor 66 sends a signal indicating the detected rotational angular speed in the yaw direction to the brake ECU 20.

The G sensor 68 detects an acceleration rate of the vehicle 2 in the front-rear direction and an acceleration rate of the vehicle 2 in the left-right direction. The G sensor sends a signal indicating the detected acceleration rate of the vehicle 2 in the front-rear direction and the detected acceleration rate of the vehicle 2 in the left-right direction to the brake ECU 20.

While the configuration in which the wheel speed sensor 54, the steering angle sensor 60, the brake oil pressure sensor 62, the accelerator operation amount sensor 64, the yaw rate sensor 66, and the G sensor 68 are each connected to the brake ECU 20 and send detection results directly to the brake ECU 20 has been described as one example with FIG. 1, at least one of the wheel speed sensor 54, the steering angle sensor 60, the brake oil pressure sensor 62, the accelerator operation amount sensor 64, the yaw rate sensor 66, and the G sensor 68 may be connected to another ECU and input a detection result to the brake ECU 20 via a communication bus or the central ECU 40.

Other than the information relating to the action plan, the brake ECU 20 further receives from the ADAS-ECU 10, for example, information relating to running states of various applications, information relating to other driving operations, such as a shift range, information relating to the behavior of the vehicle 2, and information relating to positional information on the vehicle 2.

The DCM 30 is a communication module configured to be able to perform bidirectional communication with the data center 100.

The central ECU 40 is configured, for example, to be able to communicate with the brake ECU 20 as well as be able to communicate with the data center 100 using the DCM 30. For example, the central ECU 40 sends information received from the brake ECU 20 to the data center 100 via the DCM 30.

While the central ECU 40 has been described in this embodiment as being configured to send information received from the brake ECU 20 to the data center 100 via the DCM 30, the central ECU 40 may, for example, have a function such as relaying communication between various ECUs (gateway function). Or the central ECU 40 may include a memory (not shown) of which contents stored can be updated using update information from the data center 100, and retrieve predetermined information including update information that is stored from various ECUs into the memory at system start-up of the vehicle 2.

In the vehicle 2 having the configuration as described above, the brake ECU 20 is required, for example, to efficiently evaluate the driver's driving trait during travel of the vehicle 2 using information obtained from sensors provided in the vehicle 2.

In this embodiment, therefore, the brake ECU 20 acquires an operation amount of the vehicle 2, identifies a predetermined driving state during travel of the vehicle 2 using the acquired operation amount, and calculates an amount of characteristic in the predetermined driving state that has been identified. In this embodiment, the predetermined driving state includes a steady travel state. The amount of characteristic includes a history of the speed of the vehicle 2.

Thus, by identifying the steady travel state of the vehicle 2 and calculating the history of the speed of the vehicle in the identified driving state as the amount of characteristic, a driving trait such as whether the driver is driving in harmony with the surroundings in a cluster of vehicles or whether the driver tends to observe the speed limit can be efficiently evaluated.

Figure 2:
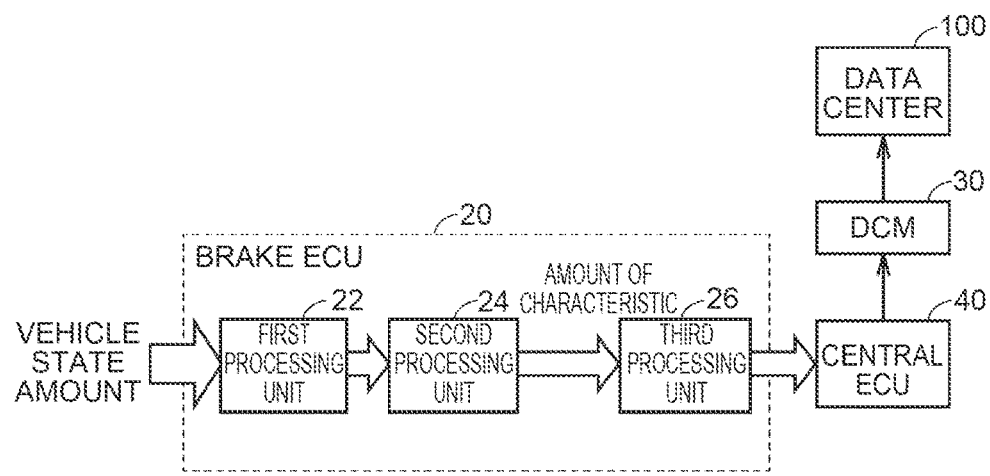
FIG. 2 is a diagram for describing the configuration of one example of an information processing device according to an embodiment.

FIG. 2 is a diagram for describing the configuration of one example of the information processing device according to this embodiment. The information processing device according to this embodiment is realized by the brake ECU 20.

The brake ECU 20 includes a first processing unit 22, a second processing unit 24, and a third processing unit 26. The first processing unit 22 receives information indicating detection results from various sensors as information relating to the behavior of the vehicle 2. The first processing unit 22 outputs, to the second processing unit 24, input information that was received during a period in which predetermined conditions were met within a period of receiving the input information.

The second processing unit 24 calculates an amount of characteristic relating to the operation of the vehicle 2 using the input information that was received during the period in which the predetermined conditions were met within the period of receiving the input information.

Figure 3:
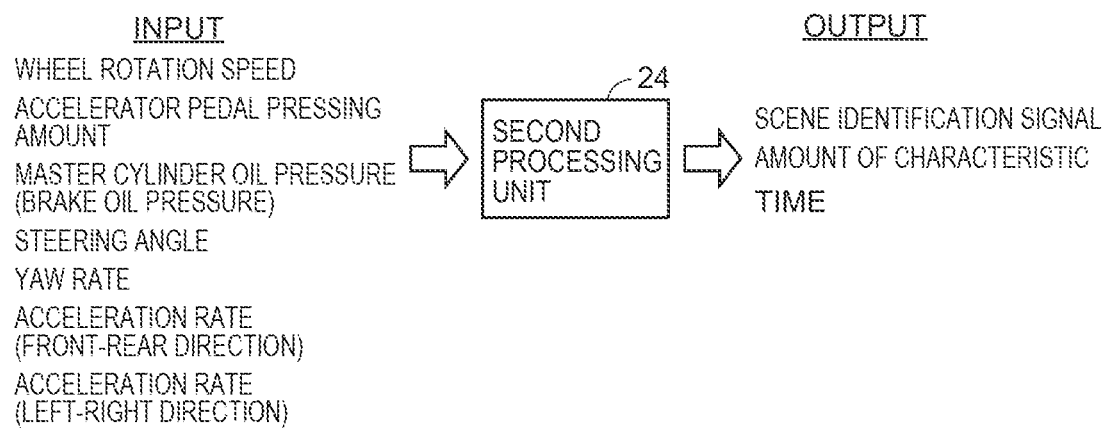
FIG. 3 is a view for describing one example of processes executed in a second processing unit.

FIG. 3 is a view for describing one example of processes executed in the second processing unit 24. As shown in FIG. 3, the rotation speed of the front wheels 50, the pressing amount of the accelerator pedal (accelerator operation amount), the master cylinder oil pressure (brake oil pressure), the steering angle, the yaw rate (the turning speed of the vehicle 2 in the yaw direction), and the acceleration rates of the vehicle 2 in the front-rear direction and the left-right direction are input from the first processing unit 22 into the second processing unit 24 as the input information. Using these pieces of input information, the second processing unit 24 determines whether predetermined conditions for identifying a predetermined driving state are met.

In this embodiment, the predetermined conditions include a condition that the vehicle 2 is traveling and that the magnitude of an amount of change in the accelerator operation amount per predetermined time is equal to or lower than a threshold value. For example, when the speed of the vehicle 2 is higher than a threshold value and moreover the magnitude of the amount of change in the accelerator operation amount per predetermined time is equal to or lower than the threshold value, the second processing unit 24 determines that the predetermined conditions are met. The predetermined time may be, for example, a time corresponding to a time interval at which the vehicle speed is acquired, or may be a time longer than this time interval.

When it is determined that the predetermined conditions are met, the second processing unit 24 turns a condition meeting flag on. The second processing unit 24 outputs a signal indicating a state of this condition meeting flag as a scene identification signal.

When it is determined that the predetermined conditions are met, the second processing unit 24 calculates an amount of characteristic relating to a driving characteristic of the driver of the vehicle 2 using the input information received during the period in which the predetermined conditions were met.

The amount of characteristic in this embodiment includes, for example, a history of the speed of the vehicle 2 (vehicle speed). In this embodiment, the second processing unit 24 outputs, as the amount of characteristic, for example, a history of the vehicle speed that is calculated using the rotation speed of the front wheels 50 acquired while the predetermined conditions are met. For example, while the predetermined conditions are met, the second processing unit 24 outputs the amount of characteristic indicating the history of the vehicle speed in association with the clock time along with the scene identification signal.

For example, when the state of the condition meeting flag included in the scene identification signal is a predetermined state (e.g., an on state), the third processing unit 26 generates information about the driver's driving characteristic using the information output from the second processing unit 24. In this embodiment, the third processing unit 26 generates a frequency distribution of the vehicle speed that was updated using the information output from the second processing unit 24.

Figure 4:
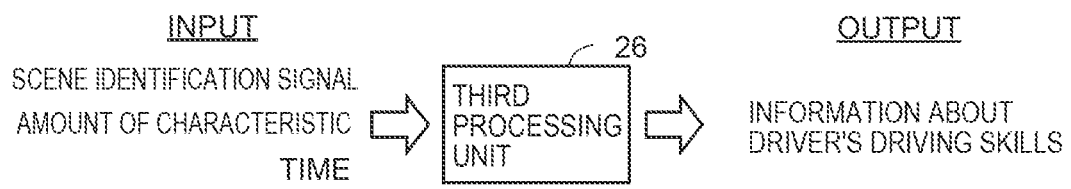
FIG. 4 is a view for describing one example of processes executed in a third processing unit.

FIG. 4 is a view for describing one example of processes executed in the third processing unit 26. As shown in FIG. 4, information indicating the scene identification signal, the amount of characteristic, and time is input from the second processing unit 24 into the third processing unit 26. The third processing unit 26 outputs information about the driver's driving characteristic to the central ECU 40.

The third processing unit 26 may generate a frequency distribution of the vehicle speed that was updated each time the information was received from the second processing unit 24, or may generate a frequency distribution of the vehicle speed that was updated each time the state where the predetermined conditions were met changed into a state where the predetermined conditions were not met, or may generate a frequency distribution of the vehicle speed that was updated in each trip.

The central ECU 40 sends the information input from the third processing unit 26 to the data center 100 via the DCM 30.

Using the output value of the third processing unit 26, the data center 100 performs an evaluation as to whether the driver's driving is driving that is in harmony with vehicles around the vehicle 2 in a cluster of vehicles, and also performs an evaluation as to whether the driver's driving is driving that observes the speed limit.

The information sent from the DCM 30 to the data center 100 includes, for example, a clock time of processing, positional information on the vehicle, and information about the frequency distribution of the vehicle speed. The data center 100 stores these pieces of information input from the DCM 30 as one aggregate of data in the storage device 12. Thus, the data center 100 can acquire information about the driving characteristic of the driver who drives the vehicle 2 that can communicate with the data center 100. Similarly, the data center 100 can acquire information about the driving characteristic of the driver who drives the vehicle 3 that can communicate with the data center 100.

Figure 5:
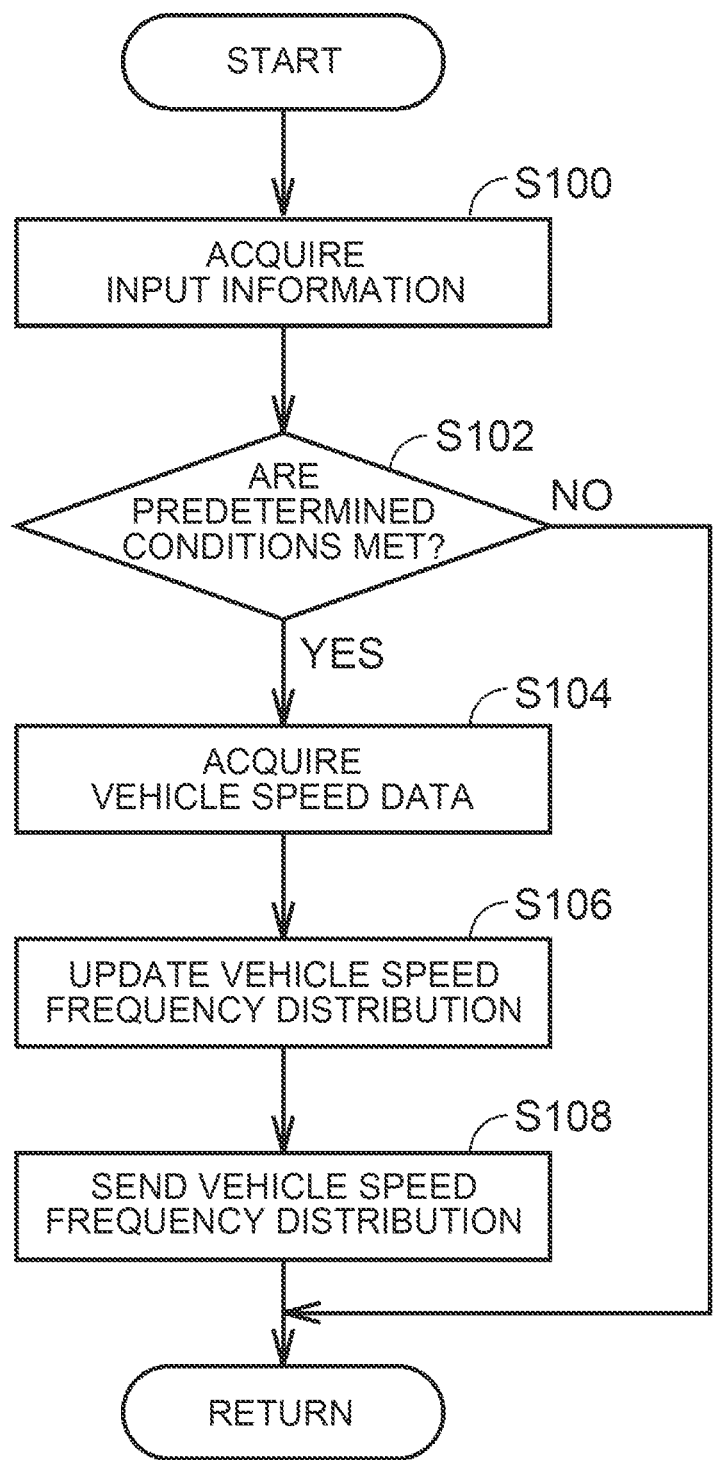
FIG. 5 is a flowchart showing one example of processes executed in a brake ECU.

Next, one example of processes executed in the brake ECU 20 of the vehicle 2 will be described with reference to FIG. 5. FIG. 5 is a flowchart showing one example of processes executed in the brake ECU 20. The series of processes shown in this flowchart is repeatedly executed by the brake ECU 20 on a predetermined control cycle.

In step (hereinafter, "step" will be represented by "S") 100, the brake ECU 20 acquires data corresponding to the input information. Specifically, the brake ECU 20 acquires data corresponding to the input information including, for example, information about the rotation speed of the front wheels 50, information about the accelerator operation amount, information about the brake oil pressure, information about the steering angle, information about the yaw rate, and information about the acceleration rates of the vehicle 2 in the front-rear direction and the left-right direction. The brake ECU 20 may acquire the data corresponding to the input information from various sensors, or may acquire the data corresponding to the input information from the memory in which detection results of various sensors are stored. Then, the process moves to S102.

In S102, the brake ECU 20 determines whether the predetermined conditions are met. The predetermined conditions are as described above and therefore will not be described in detail again. When it is determined that the predetermined conditions are met (YES in S102), the process moves to S104.

In S104, the brake ECU 20 acquires vehicle speed data showing the history of the vehicle speed. For example, the brake ECU 20 retrieves and acquires, from the memory etc., data showing the history of the vehicle speed that was acquired after the time when the vehicle speed frequency distribution was updated last time. Then, the process moves to S106.

In S106, the brake ECU 20 updates the vehicle speed frequency distribution. The brake ECU 20 creates a vehicle speed frequency distribution for each trip. Specifically, the brake ECU 20 creates a new vehicle speed frequency distribution, for example, at a timing when an ignition is turned on, and updates the vehicle speed frequency distribution using vehicle speed data showing the history of the vehicle speed that is acquired during the period in which the predetermined conditions are met. In the vehicle speed frequency distribution, for example, a plurality of speed regions that does not overlap one another is set in increments of a predetermined speed (e.g., 5 km/h). The brake ECU 20 determines to which speed region the acquired vehicle speed belongs among the plurality of speed regions, and increases a value indicating a frequency corresponding to the determined speed region. In the case where the vehicle speed is acquired at intervals of a predetermined time and the value indicating the frequency indicates, for example, a cumulative time in that speed region, a predetermined time is added to the value indicating the frequency corresponding to the determined speed region. The brake ECU 20 executes this process using the vehicle speed data indicating the history of the vehicle speed that was not used to update the vehicle speed frequency distribution last time. The brake ECU 20 ends the creation of the vehicle speed frequency distribution, for example, at a timing when the ignition is turned off, and stores the vehicle speed frequency distribution in the memory or the like. By executing this process, the brake ECU 20 creates a vehicle speed frequency distribution for each trip.

In S108, the brake ECU 20 sends the updated vehicle speed frequency distribution to the data center 100. The brake ECU 20 sends information about the updated vehicle speed frequency distribution to the central ECU 40. The central ECU 40 sends the received information to the data center 100 via the DCM 30. Then, this process is ended. When it is determined that the predetermined conditions are not met (NO in S102), this process is ended.

The process of S100, the process of S102, the process of S104, and the process of S106 described above are included in processes executed by the second processing unit 24. The process of S108 described above is included in processes executed by the third processing unit 26.

Using the received information, the data center 100 can perform an evaluation of a driving trait of the driver of the vehicle 2. The information sent to the data center 100 and the process executed in the data center 100 are as described above and therefore will not be described in detail again.

The operation of the brake ECU 20 that is the information processing device according to this embodiment based on the structure and the flowchart as described above will be described with reference to FIG. 6 and FIG. 7.

For example, when the input information is acquired during travel of the vehicle 2 (S100), it is determined whether the predetermined conditions are met (S102). When the vehicle 2 is traveling and moreover the magnitude of the amount of change in the accelerator operation amount per predetermined time is equal to or lower than the threshold value, it is determined that the predetermined conditions are met (YES in S102). Therefore, the vehicle speed data is acquired (S104) and the vehicle speed frequency distribution is updated (S106). That is, in the case where there is vehicle speed data in the same trip that was acquired while the predetermined conditions were met and that was not reflected in updating the vehicle speed frequency distribution last time, it is determined to which of the plurality of speed regions the vehicle speed included in this vehicle speed data corresponds, and a predetermined time is added to the cumulative time corresponding to the determined speed region. In this way, the vehicle speed frequency distribution is updated as the cumulative time in at least one speed region among the plurality of speed regions is calculated. The updated vehicle speed frequency distribution is sent to the data center 100 (S108).

Based on the received vehicle speed frequency distribution, the data center 100 can perform an evaluation about a driving trait of the driver of the vehicle 2.

Figure 6:
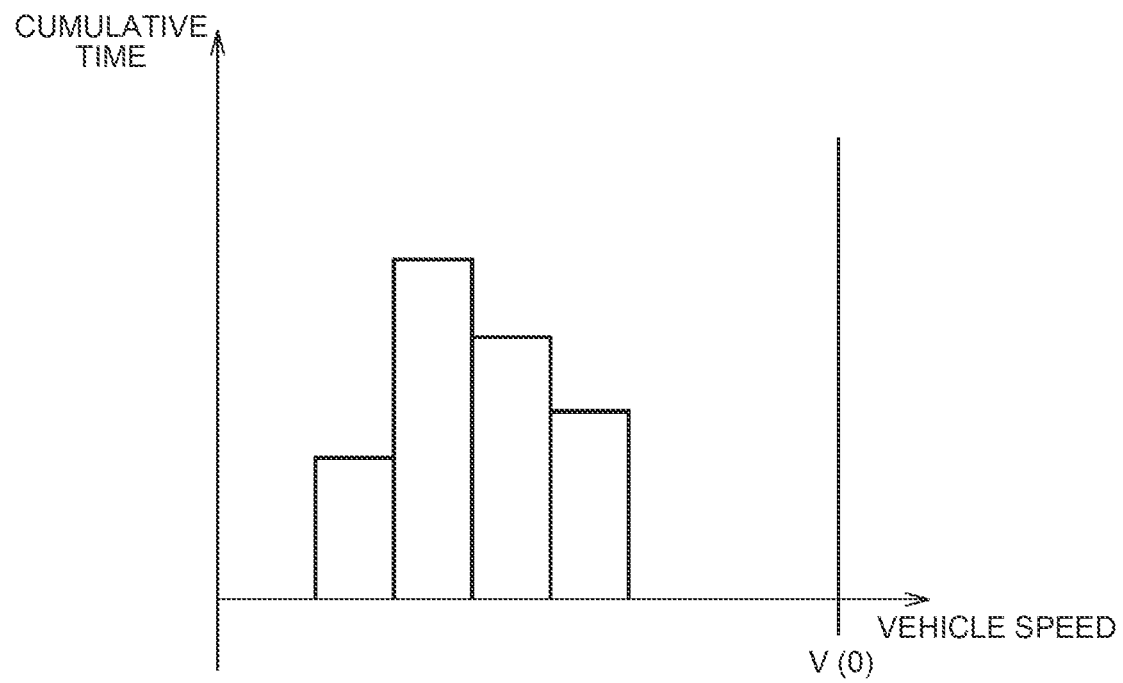
FIG. 6 is a graph showing one example of a vehicle speed frequency distribution during one trip.

FIG. 6 is a graph showing one example of the vehicle speed frequency distribution during one trip. The axis of ordinate of FIG. 6 represents the cumulative time. The axis of abscissa of FIG. 6 represents the vehicle speed. In FIG. 6, the cumulative times in the respective speed regions during one trip are shown as a bar graph. For example, a case will be assumed where the highest speed limit in the route that the driver of the vehicle 2 drove during one trip was V (0). In this case, the driver of the vehicle 2 traveled at a speed lower than the speed limit V (0) by a certain amount along the route including at least a point where the speed limit V (0) applies.

For example, the data center 100 compares the vehicle speed frequency distribution of the vehicle 2 with a vehicle speed frequency distribution of another vehicle at the same time of day that the vehicle 2 traveled the route including a point where the speed limit V (0) applies, and when the other vehicle traveled similarly at a speed lower than the speed limit V (0) by a certain amount in the vehicle speed frequency distribution, an evaluation can be made to the effect that the driver of the vehicle 2 was driving in harmony with the surroundings in a cluster of vehicles. On the other hand, when the frequency (cumulative time) of traveling near the speed limit V (0) is high in the vehicle speed frequency distribution of the other vehicle, an evaluation can be made to the effect that the driver of the vehicle 2 was driving in a speed range lower than the other vehicle in a cluster of vehicles. In this way, it is possible to perform an evaluation about the driving characteristic and the driving skills of the driver of the vehicle 2.

Figure 7:
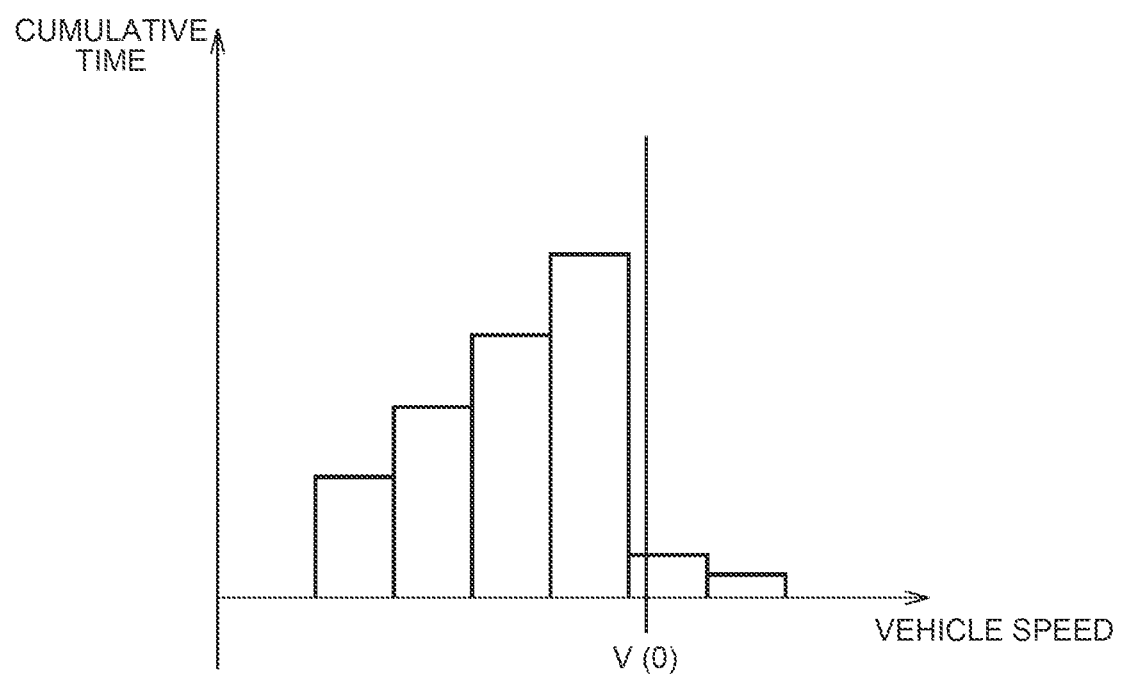
FIG. 7 is a graph showing another example of the vehicle speed frequency distribution during one trip.

FIG. 7 is a graph showing another example of the vehicle speed frequency distribution during one trip. The axis of ordinate of FIG. 7 represents the cumulative time. The axis of abscissa of FIG. 7 represents the vehicle speed. In FIG. 7, the cumulative times in the respective speed regions during one trip are shown as a bar graph. As with the case described with FIG. 6, for example, the case will be assumed where the highest speed limit in the route along which the driver of the vehicle 2 drove during one trip was V (0). In this case, the driver of the vehicle 2 traveled at a speed near the speed limit V (0) along the route including at least a point where the speed limit V (0) applies.

From such a vehicle speed frequency distribution, the data center 100 can make an evaluation to the effect that the driver of the vehicle 2 was driving while observing the speed limit V (0).

As has been described above, the information processing device according to this embodiment can determine whether the vehicle 2 is in a steady travel state based on the accelerator operation amount without using a complicated device, such as a radar. By calculating the vehicle speed in the steady travel state during driving of the vehicle 2 as the amount of characteristic, this information processing device can efficiently evaluate whether the driver's driving in the steady travel state is driving that is in harmony with the surroundings or driving that observes the speed limit. Thus, the information processing device, the vehicle, the information processing system, the information processing method, and the program that efficiently evaluate the driver's driving trait can be provided.

Further, calculating the amount of characteristic and the vehicle speed frequency distribution inside the vehicle eliminates the need for sending information for calculating the amount of characteristic and the vehicle speed frequency distribution to the outside. Thus, in a case such as where the amount of information for calculating the amount of characteristic and the vehicle speed frequency distribution is large, sending unnecessary information to the outside of the vehicle is avoided, so that an increase in communication load as well as the storage capacity and the processing cost at the data center 100 are reduced.

As the calculation of the amount of characteristic and the calculation of the vehicle speed frequency distribution are separately performed in the second processing unit 24 and the third processing unit 26, it is possible, for example, to change only the method of calculating the vehicle speed frequency distribution in the third processing unit 26 and use the vehicle speed frequency distribution for evaluation of other driving characteristics. Such a change can be realized, for example, as the brake ECU 20 reads the update information received from the data center 100 and stored in the memory of the central ECU 40.

In the following, modified examples will be described.

In the above-described embodiment, the case where the input information input into the brake ECU 20 is subjected to the process shown in the flowchart of FIG. 5 inside the brake ECU 20 to thereby calculate the amount of characteristic and the vehicle speed frequency distribution has been described as one example. Alternatively, this process may be executed in the data center 100.

Further, in the above-described embodiment, the brake ECU 20 has been described as being configured to send the vehicle speed frequency distribution to the data center 100 each time it is updated. Alternatively, for example, at the timing when the trip ends (the ignition is turned off), the vehicle speed frequency distribution updated immediately before that may be sent to the data center 100.

Moreover, in the above-described embodiment, the case where the brake ECU 20 calculates the amount of characteristic while the vehicle 2 is in the steady travel state and updates the vehicle speed frequency distribution has been described as one example. Alternatively, the brake ECU 20 may update the vehicle speed frequency distribution when the vehicle has transitioned from the steady travel state to another state using the history of the vehicle speed for the period in which the vehicle was in the steady travel state.

Furthermore, in the above-described embodiment, an evaluation of the driver's driving characteristic has been described as being performed by calculating the history of the vehicle speed in the steady travel state as the amount of characteristic, with the steady travel state as one example of the predetermined driving state, and then calculating the vehicle speed frequency distribution using the calculated amount of characteristic. However, the predetermined driving state and the amount of characteristic are not limited to those described above. The predetermined driving state may include a driving state in which the vehicle is steered while moving straight ahead, and the amount of characteristic relating to the driver's driving characteristic may include a time-integrated value of a difference between a steering angle estimated from a behavior of the vehicle 2 and an actual steering angle.

Figure 8:
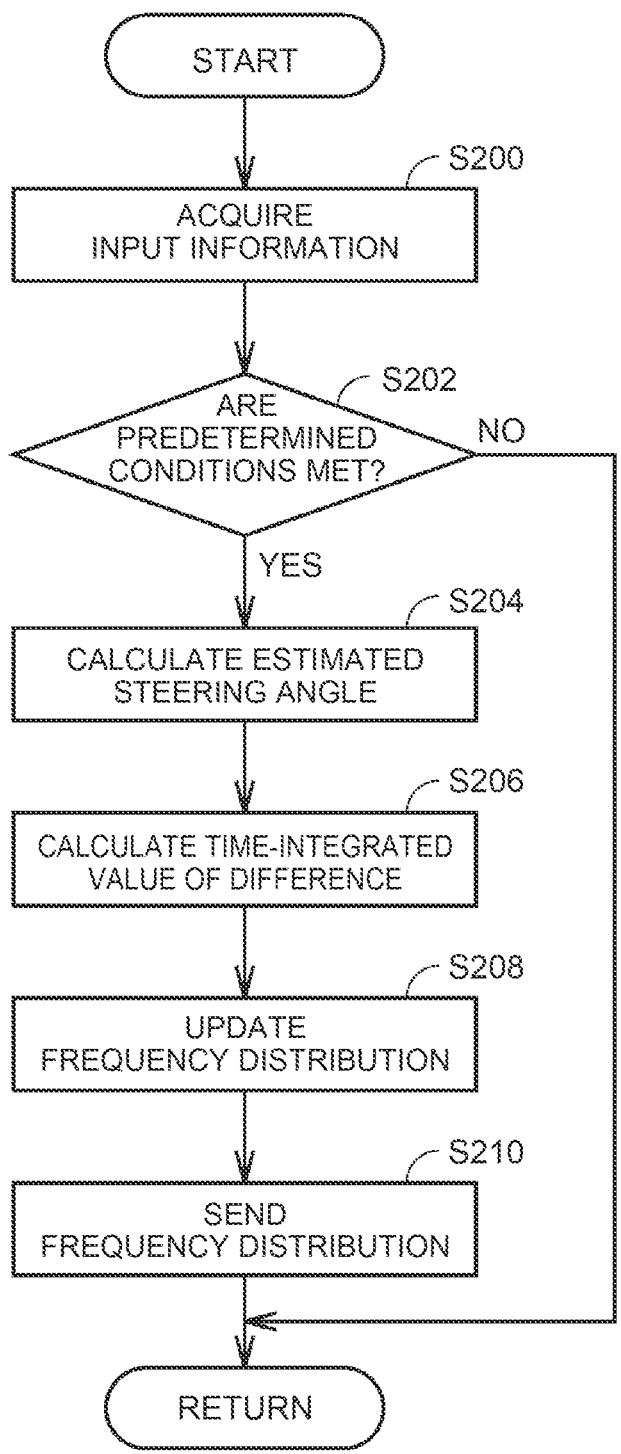
FIG. 8 is a flowchart showing one example of processes executed in the brake ECU in a modified example.

In the following, one example of processes executed in the brake ECU 20 of the vehicle 2 in this modified example will be described. FIG. 8 is a flowchart showing one example of processes executed in the brake ECU 20 in the modified example. The series of processes shown in this flowchart is repeatedly executed by the brake ECU 20 on a predetermined control cycle.

In S200, the brake ECU 20 acquires data corresponding to the input information. The process of S200 has the same processing contents as the process of S100 described above and therefore will not be described in detail again. Then, the process moves to S202.

In S202, the brake ECU 20 determines whether predetermined conditions are met. The predetermined conditions include a condition for determining whether the vehicle 2 is in a driving state in which the vehicle is steered until a final steering angle is reached while moving straight ahead. The predetermined conditions include, for example, a condition that the vehicle 2 is traveling, and a condition that the vehicle 2 is in a steering state from when an operation of the steering wheel is started while the vehicle 2 is moving straight ahead until when the operation of the steering wheel is ended. The brake ECU 20 determines whether the vehicle 2 is traveling using the rotation speed of the front wheels 50 as described above. Further, when the steering angle is not zero and moreover the magnitude of the amount of change in the steering angle is higher than a threshold value, the brake ECU 20 determines that the vehicle is in the steering state. When it is determined that the predetermined conditions are met (YES in S202), the process moves to S204.

In S204, the brake ECU 20 calculates the estimated steering angle. The brake ECU 20 calculates, for example, a steering angle estimated from the behavior of the vehicle 2 as the estimated steering angle. More specifically, the brake ECU 20 calculates the estimated steering angle using the rotational angular speed of the vehicle 2 in the yaw direction, the acceleration rate of the vehicle 2 in the left-right direction, and the vehicle speed. The brake ECU 20 acquires the rotational angular speed in the yaw direction from the yaw rate sensor 66. Further, the brake ECU 20 acquires the acceleration rate of the vehicle 2 in the left-right direction from the G sensor 68. For the method of calculating the estimated steering angle using the rotational angular speed in the yaw direction, the acceleration rate of the vehicle 2 in the left-right direction, and the vehicle speed, a publicly known technique can be used and therefore this method will not be described in detail. Then, the process moves to S206.

Figure 9:
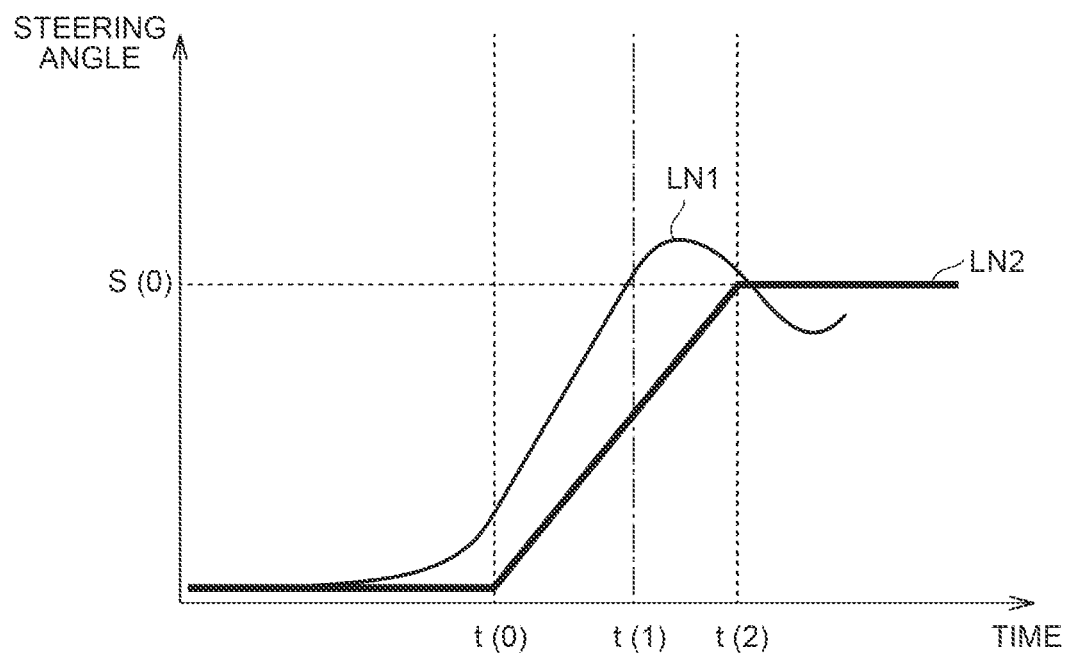
FIG. 9 is a graph for describing a method of calculating a time-integrated value of a difference between an estimated steering angle and an actual steering angle.

In S206, the brake ECU 20 calculates a time-integrated value of the difference between the estimated steering angle and the actual steering angle. FIG. 9 is a graph for describing the method of calculating the time-integrated value of the difference between the estimated steering angle and the actual steering angle. The axis of ordinate of FIG. 9 represents the steering angle. The axis of abscissa of FIG. 9 represents time. LN1 of FIG. 9 represents changes in the actual steering angle. LN2 of FIG. 9 represents changes in the steering angle estimated from the behavior of the vehicle 2.

The steering angle estimated from the behavior of the vehicle 2 is calculated such that, as represented by LN2 of FIG. 9, the steering angle starts to change at time t (0) from a steering angle (zero) corresponding to a state of moving straight ahead, and changes without fluctuations until reaching a final steering angle S (0) at time t (2).

On the other hand, since a mechanism of the steering wheel has play, backlash, etc. and the driver's operation varies, the actual steering angle of the vehicle 2 fluctuates as represented by LN1 of FIG. 9, for example, as the steering angle increases before time t (0) and becomes larger than the final steering angle S (0).

Therefore, the time-integrated value of the difference between the estimated steering angle and the actual steering angle corresponds to the area of the figure part surrounded by LN1 and LN2 of FIG. 9. That is, for example, when calculating the time-integrated value of the difference between the estimated steering angle and the actual steering angle at time t (1), the brake ECU 20 calculates the area surrounded by LN1 of FIG. 9, LN2 of FIG. 9, and the long dashed short dashed line indicating time t (1). Finally, the brake ECU 20 calculates, as the time-integrated value of the difference, the area of the figure part surrounded by LN1 of FIG. 9 and LN2 of FIG. 9 up to the point where the steering state disappears. Then, the process moves to S208.

In S208, the brake ECU 20 updates the frequency distribution. The brake ECU 20 determines, for example, to which range the time-integrated value of the difference calculated during the period from when the steering state arose until when the steering state disappeared corresponds among a plurality of ranges that is divided in order of the magnitude of the value, and increases the frequency (the number of times) corresponding to the determined range by a predetermined value (e.g., one). In this frequency distribution, when the number of times of a range corresponding to a small time-integrated value of the difference is higher, this means that the difference between the actual steering angle and the estimated steering angle is smaller, i.e., the driver tends to drive with less of wasteful steering operation. Further, when the number of times of a range corresponding to a large time-integrated value of the difference is higher, this means that the difference between the actual steering angle and the estimated steering angle is larger, i.e., the driver tends to drive with more of wasteful steering operation. Then, the process moves to S210.

In S210, the brake ECU 20 sends the updated frequency distribution to the data center 100. The brake ECU 20 sends information about the updated frequency distribution to the data center 100 via the central ECU 40 and the DCM 30. Then, this process is ended. When it is determined that the predetermined conditions are not met (NO in S202), this process is ended.

The process of S200, the process of S202, the process of S204, the process of S206, and the process of S208 described above are included in processes executed by the second processing unit 24. The process of S210 described above is included in processes executed by the third processing unit 26.

The data center 100 can perform an evaluation of a driving trait of the driver of the vehicle 2 using the information received from the DCM 30 of the vehicle 2. That is, using the received frequency distribution, the data center 100 can perform an evaluation as to whether driving of the vehicle 2 (particularly operation of the steering wheel) is that by a driver who is used to driving or that by a driver who is not used to driving.

The information sent from the DCM 30 to the data center 100 includes, for example, a clock time of processing, positional information on the vehicle 2, and information about the time-integrated value of the difference between the estimated steering angle and the actual steering angle.

For example, the data center 100 may perform an evaluation of a driving characteristic of the driver of the vehicle 2 by comparing the received frequency distribution with a frequency distribution of a time-integrated value of a difference between an estimated steering angle and an actual steering angle of driving by a skilled driver. For example, when the magnitude of a difference between a first mean value of the time-integrated value of the difference between the estimated steering angle and the actual steering angle of driving by a skilled driver and a second mean value of the time-integrated value of the difference between the estimated steering angle and the actual steering angle of driving by the driver of the vehicle 2 is equal to or smaller than a threshold value, the data center 100 may make an evaluation to the effect that the driver of the vehicle 2 is a driver who is used to driving. Or, for example, when the magnitude of the difference between the first mean value and the second mean value is higher than the threshold value, the data center 100 may make an evaluation to the effect that the driver of the vehicle 2 is a driver who is not used to driving.

The operation of the brake ECU 20 in this modified example based on the structure and the flowchart as described above will be described.

For example, when the input information is acquired during travel of the vehicle 2 (S200), it is determined whether predetermined conditions are met (S202). When the vehicle 2 is traveling and moreover in the steering state, it is determined that the predetermined conditions are met (YES in S202). Therefore, the estimated steering angle is calculated (S204), and the time-integrated value of the difference between the estimated steering angle having been calculated and the actual steering angle is calculated (S206). The frequency distribution is updated using the calculated time-integrated value of the difference (S208). The updated frequency distribution is sent to the data center 100 (S210).

The data center 100 can perform an evaluation about a driving trait of the driver of the vehicle 2 based on the received frequency distribution. The method of evaluation based on the frequency distribution is as described above and therefore will not be described in detail again.

As has been described above, the information processing device according to this modified example can determine whether the vehicle is in the steering state during travel without using a complicated device. By calculating the time-integrated value of the difference between the estimated steering angle and the actual steering angle in the steering state during travel as the amount of characteristic, this information processing device can efficiently evaluate whether the driver of the vehicle 2 is a driver who is used to driving or a driver who is not used to driving.

In the above-described modified example, the brake ECU 20 has been described as being configured to send the frequency distribution to the data center 100 each time it is updated. Alternatively, for example, at the timing when the trip ends (the ignition is turned off), the frequency distribution updated immediately before that may be sent to the data center 100.

In the above-described modified example, the case where the brake ECU 20 calculates the amount of characteristic while the vehicle is in the steering state during travel and updates the frequency distribution has been described as one example. Alternatively, the brake ECU 20 may update the frequency distribution, for example, when the vehicle has transitioned from the steering state to another state during travel, using the time-integrated value of the difference between the estimated steering angle and the actual steering angle in the period when the vehicle was in the steering state.

Further, in the above-described embodiment, an evaluation of the driver's driving characteristic has been described as being performed by calculating the history of the vehicle speed in the steady travel state as the amount of characteristic, with the steady travel state as one example of the predetermined driving state, and then calculating the frequency distribution using the calculated amount of characteristic. However, the predetermined driving state and the amount of characteristic are not limited to those described above. The predetermined driving state may include a driving state in which a braking operation is performed while the vehicle is traveling, and the amount of characteristic relating to the driver's driving characteristic may include a difference between a peak value of the brake oil pressure immediately after the start of braking and a mean value of the brake oil pressure in a predetermined period after a peak.

Figure 10:
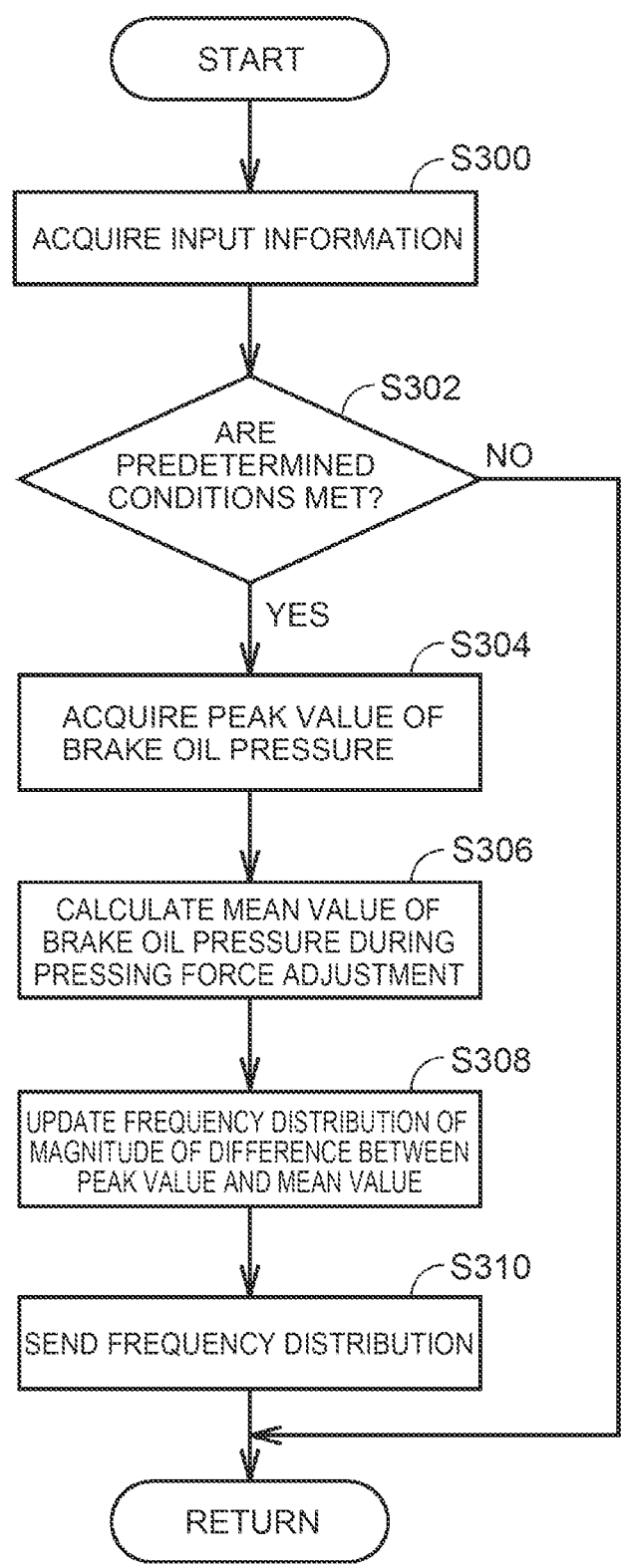
FIG. 10 is a flowchart showing another example of processes executed in the brake ECU in a modified example.

In the following, another example of processes executed in the brake ECU 20 of the vehicle 2 in this modified example will be described with reference to FIG. 10. FIG. 10 is a flowchart showing another example of processes executed in the brake ECU 20 in the modified example. The series of processes shown in this flowchart is repeatedly executed by the brake ECU 20 on a predetermined control cycle.

In S300, the brake ECU 20 acquires data corresponding to the input information. The process of S300 has the same processing contents as the process of S100 described above and therefore will not be described in detail again. Then, the process moves to S302.

In S302, the brake ECU 20 determines whether predetermined conditions are met. The predetermined conditions include a condition for determining whether the vehicle is in a driving state in which a braking operation is performed while the vehicle 2 is traveling. The brake ECU 20 determines that the predetermined conditions are met, for example, when there are a history of the brake oil pressure indicating that braking was started while the vehicle 2 was traveling and a history of the brake oil pressure indicating that braking was ended. The brake ECU 20 determines that there is a history of the brake oil pressure indicating that braking was started while the vehicle 2 was traveling, for example, when the brake oil pressure increases beyond a threshold value (an upper limit value of a range of the brake oil pressure in which no braking force is exerted on the vehicle 2) while the rotation speed of the front wheels 50 is equal to or higher than a threshold value, and moreover the brake oil pressure is zero during a predetermined period before the point at which the brake oil pressure increases. When the brake oil pressure becomes equal to or lower than the threshold value after that, the brake ECU 20 determines that there is a history of the brake oil pressure indicating that braking was ended. When it is determined that the predetermined conditions are met (YES in S302), the process moves to S304.

Figure 11:
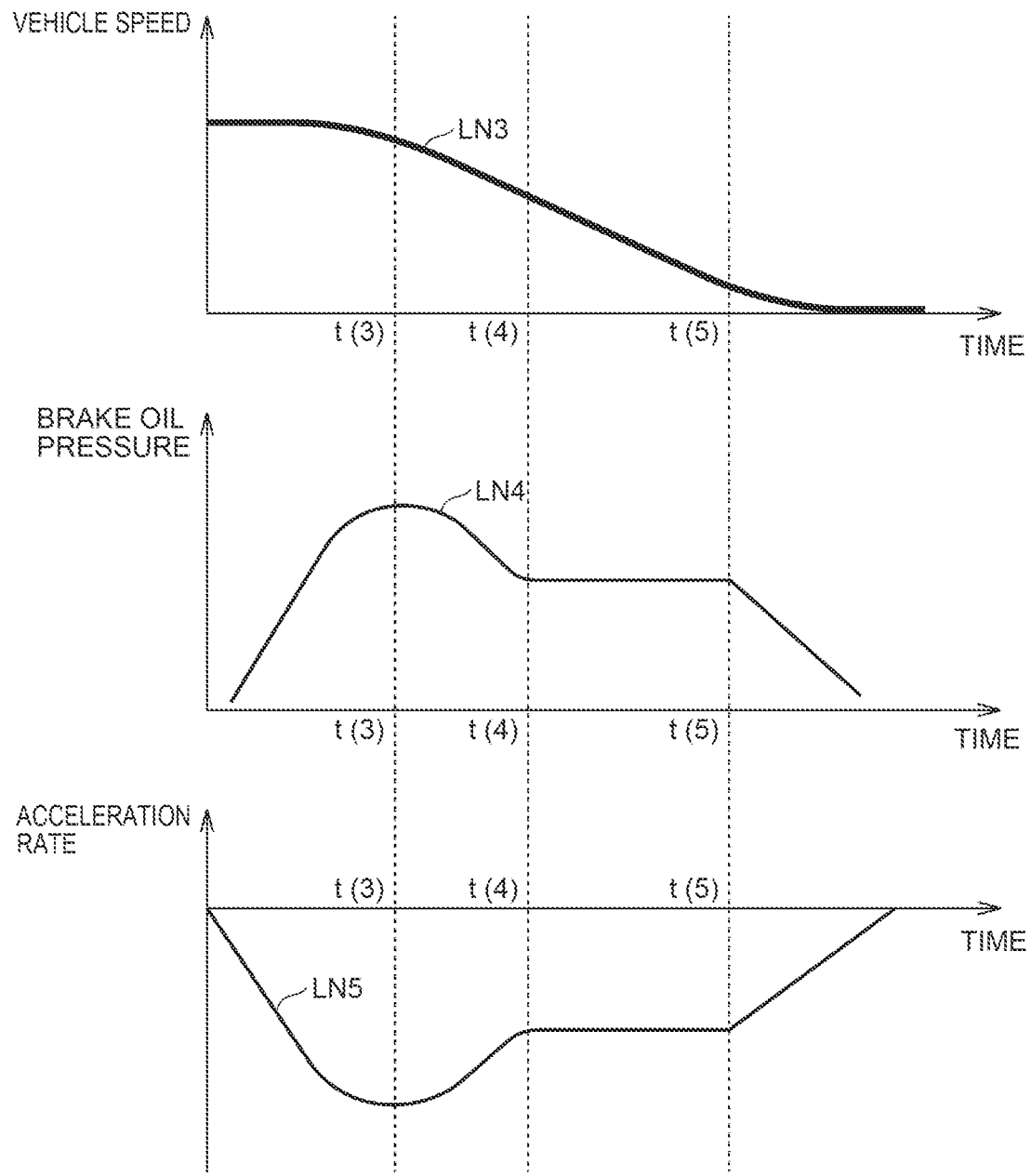
FIG. 11 is graphs showing one example of changes in a vehicle speed, a brake oil pressure, and an acceleration rate during braking operation.

In S304, the brake ECU 20 calculates the peak value from the history of the brake oil pressure for the period in which the brake operation was performed. FIG. 11 is graphs showing one example of changes in the vehicle speed, the brake oil pressure, and the acceleration rate during a braking operation. Changes in the vehicle speed are shown at the top of FIG. 11; changes in the brake oil pressure are shown at the center of FIG. 11; and changes in the acceleration rate of the vehicle 2 are shown at the bottom of FIG. 11. The axis of ordinate and the axis of abscissa at the top of FIG. 11 represent the vehicle speed and time, respectively. The axis of ordinate and the axis of abscissa at the center of FIG. 11 represent the brake oil pressure and time, respectively. The axis of ordinate and the axis of abscissa at the bottom of FIG. 11 represent the acceleration rate and time, respectively. LN3 of FIG. 11 represents a history of changes in the vehicle speed. LN4 of FIG. 11 represents a history of changes in the brake oil pressure. LN5 of FIG. 11 represents a history of changes in the acceleration rate. FIG. 11 shows changes in the vehicle speed, the brake oil pressure, and the acceleration rate caused by a series of actions as follows. When the brake pedal is pressed and braking is started while the vehicle 2 is traveling, the vehicle speed decreases and the brake oil pressure and the deceleration rate increase. After that, the brake oil pressure is held constant by the driver's adjustment of the pressing force on the brake pedal, and then the vehicle 2 stops. When the vehicle 2 stops, pressing on the brake pedal is removed.

The brake ECU 20 calculates, as the peak value, for example, a maximum value of the brake oil pressure in the period in which the braking operation was performed. For example, the brake ECU 20 calculates, as the peak value, the brake oil pressure at time t (3) in the history of the brake oil pressure represented by LN4 of FIG. 11. Then, the process moves to S306.

In S306, the brake ECU 20 calculates a mean value of the brake oil pressure during adjustment of the pressing force. The brake ECU 20 calculates the mean value of the brake oil pressure in the period of pressing force adjustment (the period from time t (4) to time t (5) in FIG. 11) from the history of the brake oil pressure for the period in which the braking operation was performed. For example, the brake ECU 20 regards, as the period of pressing force adjustment, a period of the brake oil pressure in which the magnitude of the amount of change in the brake oil pressure per unit time is equal to or lower than a threshold value, and calculates the mean value of the brake oil pressure in this period. Then, the process moves to S308.

In S308, the brake ECU 20 updates the frequency distribution of the magnitude of the difference between the peak value and the mean value of the brake oil pressure. The brake ECU 20 determines to which range the magnitude of the difference corresponds among a plurality of ranges that is divided in order of the magnitude of the value (e.g., four levels of very high, high, medium, and low), and increases the frequency (the number of times) corresponding to the determined range by a predetermined value (e.g., one). In this frequency distribution, for example, when the frequency of a range corresponding to a low magnitude of the difference is higher, this means that the driver has a tendency of not performing a braking operation in such a manner that a large braking force is generated at an initial stage after starting the braking operation (i.e., the driver is not used to a braking operation). Further, in this frequency distribution, for example, when the frequency of a range corresponding to a high magnitude of the difference is higher, this means that the driver has a tendency of performing a braking operation in such a manner that a large braking force is generated at an initial stage after starting the braking operation (i.e., the driver is used to a braking operation). Then, the process moves to S310.

In S310, the brake ECU 20 sends the updated frequency distribution to the data center 100. The brake ECU 20 sends information about the updated frequency distribution to the data center 100 via the central ECU 40 and the DCM 30. Then, this process is ended. When it is determined that the predetermined conditions are not met (NO in S302), this process is ended.

The process of S300, the process of S302, the process of S304, the process of S306, and the process of S308 described above are included in processes executed by the second processing unit 24. The process of S310 described above is included in processes executed by the third processing unit 26.

The data center 100 can perform an evaluation of a driving trait of the driver of the vehicle 2 using the information received from the DCM 30 of the vehicle 2. That is, using the received frequency distribution, the data center 100 can perform an evaluation as to whether driving of the vehicle 2 (particularly a braking operation) is that by a driver who is used to driving or that by a driver who is not used to driving.

The information sent from the DCM 30 to the data center 100 includes, for example, a clock time of processing, positional information on the vehicle 2, and information about the difference between the peak value and the mean value.

For example, the data center 100 may compare the received frequency distribution with a frequency distribution of a magnitude of a difference between a peak value and a mean value of driving by a skilled driver to perform an evaluation of the driving characteristic of the driver of the vehicle 2. For example, when the magnitude of the difference between a first mean value of the magnitude of the difference between the peak value and the mean value of driving by the skilled driver and a second mean value of the magnitude of the difference between the peak value and the mean value of driving by the driver of the vehicle 2 is equal to or lower than a threshold value, the data center 100 may make an evaluation to the effect that the driver of the vehicle 2 is a driver who is used to driving. Or, for example, when the magnitude of the difference between the first mean value and the second mean value is higher than the threshold value, the data center 100 may make an evaluation to the effect that the driver of the vehicle 2 is a driver who is not used to driving.

The operation of the brake ECU 20 in this modified example based on the structure and the flowchart as described above will be described.

For example, when the input information is acquired during travel of the vehicle 2 (S300), it is determined whether predetermined conditions are met (S302). It is determined that the predetermined conditions are met (YES in S302) when a braking operation is started while the vehicle 2 is traveling and then the braking operation is ended. Therefore, the peak value of the brake oil pressure is calculated from the history of the brake oil pressure for the period in which the braking operation was performed (S304), and the mean value of the brake oil pressure during adjustment of the pressing force is calculated (S306). The frequency distribution is updated using the magnitude of the difference between the calculated peak value and the mean value (S308). The updated frequency distribution is sent to the data center 100 (S310).

The data center 100 can performs an evaluation about a driving trait of the driver of the vehicle 2 based on the received frequency distribution. The method of evaluation based on the frequency distribution is as described above and therefore will not be described in detail again.

As has been described above, the information processing device according to this modified example can determine whether a braking operation was performed during travel without using a complicated device. By calculating the magnitude of the difference between the peak value of the brake oil pressure in the period in which braking was performed and the mean value of the brake oil pressure during adjustment of the pressing force as the amount of characteristic, this information processing device can efficiently evaluate whether the driver of the vehicle 2 is a driver who is used to driving or a driver who is not used to driving.

In the above-described modified example, the brake ECU 20 has been described as being configured to send the frequency distribution to the data center 100 each time it is updated. Alternatively, for example, at the timing when the trip ends (the ignition is turned off), the frequency distribution updated immediately before that may be sent to the data center 100.

All or some of the above-described modified examples may be implemented in combination as appropriate. The embodiment disclosed this time should be deemed to be in every respect illustrative and not restrictive. The scope of the present disclosure is shown by the claims and not by the description given above, and is intended to include all changes equivalent in meaning and scope to the claims.

What is claimed is:

1. An information processing device that calculates an amount of characteristic relating to a driving characteristic of a driver of a vehicle, the information processing device comprising:
an electronic control unit that includes a processor, the electronic control unit being configured to:
acquire an amount of operation of the vehicle;
identify a predetermined driving state during travel of the vehicle using the amount of operation that has been acquired; and
calculate the amount of characteristic in the predetermined driving state, wherein
the predetermined driving state includes a driving state in which the vehicle is steered while moving straight ahead, and
the amount of characteristic includes a time-integrated value of a difference between a first steering amount that is estimated from a behavior of the vehicle and a second steering amount that is an actual amount steered.

2. The information processing device according to claim 1, wherein the electronic control unit is further configured to calculate a frequency distribution of the time-integrated value.

3. A vehicle comprising the information processing device according to claim 1.

4. An information processing system comprising:
the information processing device according to claim 1; and
a server that manages information sent from the information processing device.

5. The information processing device according to claim 1, wherein the electronic control unit acquires data of the amount of operation of the vehicle from at least one sensor provided on the vehicle.

6. The information processing device according to claim 1, wherein the electronic control unit acquires data of the amount of operation of the vehicle from a memory in which is stored the data of the amount of operation of the vehicle obtained from at least one sensor provided on the vehicle.

7. An information processing device that calculates an amount of characteristic relating to a driving characteristic of a driver of a vehicle, the information processing device comprising:
an electronic control unit that includes a processor, the electronic control unit being configured to:
acquire an amount of operation of the vehicle;
identify a predetermined driving state during travel of the vehicle using the amount of operation that has been acquired; and
calculate the amount of characteristic in the predetermined driving state, wherein
the predetermined driving state includes a driving state until the vehicle that is traveling is stopped, and
the amount of characteristic includes a difference between a peak value of a brake oil pressure and a mean value of the brake oil pressure after a peak.

8. The information processing device according to claim 7, wherein the electronic control unit is further configured to identify to which class the difference corresponds among a plurality of classes that is divided in order of a magnitude of the difference.

9. A vehicle comprising the information processing device according to claim 7.

10. An information processing system comprising:
the information processing device according to claim 7; and
a server that manages information sent from the information processing device.

11. The information processing device according to claim 7, wherein the electronic control unit acquires data of the amount of operation of the vehicle from at least one sensor provided on the vehicle.

12. The information processing device according to claim 7, wherein the electronic control unit acquires data of the amount of operation of the vehicle from a memory in which is stored the data of the amount of operation of the vehicle obtained from at least one sensor provided on the vehicle.

* * * * *